Patented June 24, 1941

2,247,256

UNITED STATES PATENT OFFICE 2,247,256

CYCLIC ACETALS AND PRODUCTION THEREOF

Murray Senkus, Terre Haute, Ind., assignor to Commercial Solvents Corporation, Terre Haute, Ind., a corporation of Maryland No Drawing. Application April 26, 1940, Serial No. 331,770

8 Claims. (Cl. 260—338)

My invention relates to new and useful cyclic acetals. More particularly, it is concerned with 5-amino-1,3-dioxanes having the following general structural formula:

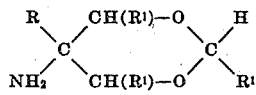

wherein R may represent hydrogen, alkyl, or alpha-hydroxy-alkyl, and R¹ may be either hydrogen, alykl, aryl, or furyl. As examples of the 5-amino-1,3-dioxanes which may be included within the scope of my invention, are the 2-phenyl-5-amino-1,3-dioxanes, the 2-(3-heptyl)-5-amino-1,3-dioxanes, and the 2-propyl-5-amino-1,3-dioxanes, which have the following structural formulas:

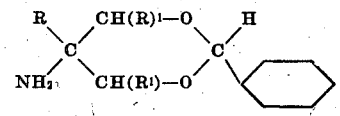

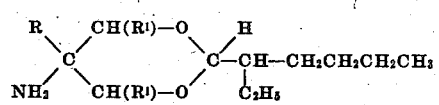

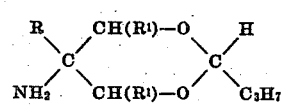

wherein R may represent hydrogen, alkyl, or alpha-hydroxy-alkyl, and R¹ may be either hydrogen, alkyl, aryl, or furyl.

The 5-amino-1,3-dioxanes of my invention may be prepared by any procedure which provides conditions that are favorable to acetal formation such as, for example, by reacting the desired aldehyde with an amino-polyhydroxy compound in the presence of a suitable catalyst. I prefer, however, to prepare these compounds by the catalytic hydrogenation of the corresponding nitro compounds. According to this process the corresponding nitro compound is subjected to hydrogenation at normal or elevated pressures in the presence of a nickel catalyst in the liquid phase, with or without an auxiliary solvent at a temperture below 125 C. In general, any hydrogenation catalyst is desirable which possesses catalytic activity under the conditions employed. I desire, however, to use a finely-divided nickel catalyst which may be prepared as follows: a nickel-aluminum alloy is prepared in the powdered form, such alloy containing 50% aluminum and 50% nickel. The aluminum is dissolved out of the powdered alloy by strong alkali solution, and the remaining leached nickel residue is washed free from alkali and salts, with water and kept under liquid. The catalyst, produced in this manner, is active at temperatures as low as approximately 25° C. and has an exceptionally long life.

The hydrogenation reaction in general may be effected at hydrogen pressures ranging from atmospheric pressure to pressures slightly below those which tend to cleave the acetal linkage. I have found it preferable, however, to carry out such reactions at a pressure of approximately 2000 pounds per square inch and at a temperature of about 25° C., in the presence of thorough agitation. The rate of reaction is directly proportional to the temperatures and pressures utilized and therefore, if a lower pressure is desired, a correspondingly higher temperature must be employed. Lower temperatures and pressures will ordinarily require a longer reaction time and, conversely, higher pressures and temperatures will in general shorten the time for completion of the reaction. However, under the latter conditions excessive pressures and/or temperatures, even with a short reaction period, tend to result in lower yields of the desired amino compound. When carrying out the reaction in accordance with the preferred conditions described above, the hydrogenation is in general found to be complete after a period of from one to two hours. Optimum conditions in regard to the temperature, pressure, and catalyst, in any given instance, however, may be readily determined by simple experiment. Also, it is generally desirable to employ a suitable solvent such as methyl or ethyl alcohols.

After the reaction is complete, as may be evidenced by the failure of additional hydrogen absorption, the catalyst is separated from the reaction mixture by filtration and the solvent, if employed, is distilled off. The 5-amino-1,3-dioxanes, obtained in this manner are, in general, relatively pure products. However, if it is desired to purify these materials further, if solids at ordinary temperatures, they may be recrystallized readily from the common organic solvents, such as acetone, ether, benzene, and the like. The products which are liquids at ordinary temperatures may be purified further by distillation under reduced pressure.

The 5-nitro-1,3-dioxanes employed in the preparation of these compounds, may be produced in accordance with any suitable procedure. However, I prefer to prepare such compounds in accordance with the process described in my copending application, Serial No. 331,769 filed April 26, 1940. According to this process approximately equivalent amounts of the polyhydroxy nitro compound and the desired aldehyde are heated in the presence of a small amount of an acid catalyst, such as hydrochloric acid and, if desired, in the presence of an organic liquid such as benzene or toluene, which is capable of removing the water produced during the reaction, in the form of a constant boiling mixture. I have found this reaction to be very general in character, and may be effected between any aldehyde and a polyhydroxy compound of the type herein disclosed. Suitable aldehydes, which may be employed in this reaction, are formaldehyde, acetaldehyde, butyraldehyde, heptaldehyde, 2-ethyl hexanal, benzaldehyde, furfuraldehyde, and the like. As examples of polyhydroxy nitro compounds which may be utilized, there may be mentioned tris-(hydroxymethyl)-nitromethane, vention are either colorless liquids, or crystalline white crystalline solids, and have been found to be soluble in water, methanol, acetone, ether, and benzene. They are, in general, stable compounds, some of which are capable of withstanding temperatures as high as 200° C., with only slight decomposition. The following data were determined for certain of the 5-amino-1,3-dioxanes prepared as described above:

Table

| Compound | Melting point, °C. (uncorrected) | Boiling point, °C. (uncorrected) | Nitrogen analysis | | Neutral equiv. | |
|---|---|---|---|---|---|---|
| | | | Calc. | Found | Calc. | Found |
| 2-propyl-5-hydroxy-methyl-5-amino-1,3-dioxane | 34 | | 8.00 | 8.04 | 175.0 | 176.0 |
| 2-propyl-5-methyl-5-amino-1,3-dioxane | | 197.3 (748 mm.) | 8.8 | 8.73 | 159.0 | 161 |
| 2-(3-heptyl)-5-methyl-5-amino-1,3-dioxane | | 103-4 (2 mm.) | 6.51 | 6.45 | | |
| 2-phenyl-5-methyl-5-amino-1,3-dioxane | 82 | | 7.25 | 7.23 | | |
| 5-ethyl-5-amino-1,3-dioxane | | 181 (760 mm.) | 10.69 | 10.76 | | |

2-nitro-1,3-propanediol, 2-propyl-2-nitro-1,3-propanediol, 2,8-dimethyl-5-nitro-4,6-nonanediol, 1,3-diphenyl-2-nitro-1,3-propanediol, 1,3-difuryl-2-nitro-1,3-propanediol, and the like.

My invention may be further illustrated by the following specific examples:

Example I

One hundred fifteen parts of 2-propyl-5-hydroxy-methyl-5-nitro-1,3-dioxane, 650 parts of methanol and 5 parts of nickel catalyst, prepared as described above, were placed in a suitable hydrogenation apparatus and sealed. This solution was then hydrogenated at a pressure of 2000 pounds per square inch at 25° C., for a period of one hour with constant agitation. After absorption of hydrogen had ceased, the reaction mixture was withdrawn from the hydrogenation apparatus, the catalyst removed from the solution by filtration and the methanol separated from the reaction mixture by means of fractional distillation. The 2-propyl-5-hydroxymethyl-5-amino-1,3-dioxane thus obtained amounted to 95 parts, corresponding to a 96% yield and was substantially free from impurities. Further purification was effected, however, by recrystallizing once from ether. The crystalline product obtained in this manner melted at 34° (uncorrected).

Example II 2-phenyl-5-methyl-5-amino-1,3-dioxane was prepared by dissolving 131 parts of 2-phenyl-5-methyl-5-nitro-1,3-dioxane in 700 parts of methanol. This solution was then hydrogenated under conditions similar to those described in Example I in the presence of 7 parts of nickel catalyst. The corresponding amino compound was obtained in 96% yield and melted at 82° C. (uncorrected) after one crystallization from ether.

Example III

One hundred and twenty-four parts of 2-(3-heptyl)-5-methyl-5-nitro-1,3-dioxane was dissolved in 700 parts of methanol and the resulting solution subjected to hydrogenation in the presence of 7 parts of nickel catalyst, according to the procedure outlined in Example I. The resulting product, 2-(3-heptyl)-5-methyl-5-amino-1,3-dioxane, distilled at 100-104° C. (2 mm.), and amounted to 94 parts, corresponding to a yield of 86%.

The 5-amino-1,3-dioxanes of the present invention are either colorless liquids, or crystalline Since the number of preparations of each of these compounds was limited, it is to be understood that, while the above properties given will be useful in identifying the compounds of my invention, I do not desire to be restricted to products having the exact properties listed.

The 5-amino-1,3-dioxanes of my invention have been found to be useful in the formulation of various coating compositions. They are likewise useful as intermediates in the preparation of numerous organic compounds. Other uses of these products will readily occur to those skilled in the art.

My invention now having been described, what I claim is:

1. 5-amino-1,3-dioxanes having the structural formula:

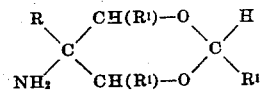

wherein R is a member of the class consisting of hydrogen, alkyl, and alpha-hydroxyalkyl, $R^1$ is a member of the class consisting of hydrogen, alkyl, aryl, and furyl.

2. 5-amino-1,3-dioxanes of the formula:

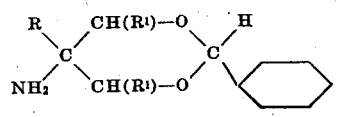

wherein R is a member of the class consisting of hydrogen, alkyl, and alpha-hydroxyalkyl, and $R^1$ is a member of the class consisting of hydrogen, alkyl, aryl, and furyl.

3. 5-amino-1,3-dioxanes of the formula:

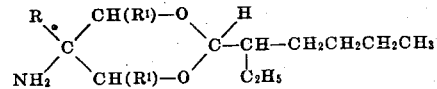

wherein R is a member of the class consisting of hydrogen, alkyl, and alpha-hydroxyalkyl, and $R_1$ is a member of the class consisting or hydrogen, alkyl, aryl, and furyl.

4. 5-amino-1,3-dioxanes of the formula:

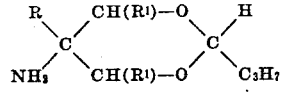

wherein R is a member of the class consisting of hydrogen, alkyl, and alpha-hydroxyalkyl, and $R^1$ is a member of the class consisting of hydrogen, alkyl, aryl, and furyl.

5. 2-propyl-5-hydroxymethyl-5-amino-1,3-dioxane.

6. 2-phenyl-5-methyl-5-amino-1,3-dioxane.

7. 2-(3-heptyl)-5-methyl-5-amino-1,3-dioxane.

8. In a process for the direct hydrogenation of 5-nitro-1,3-dioxanes to the corresponding 5-amino-1,3-dioxanes, the step which comprises subjecting a 5-nitro-1,3-dioxane to hydrogenation in the liquid phase in the presence of a hydrogenation catalyst at a temperature below 125° C.

MURRAY SENKUS.